US009761902B2

(12) United States Patent
Tsukagoshi et al.

(10) Patent No.: US 9,761,902 B2
(45) Date of Patent: Sep. 12, 2017

(54) METHOD FOR MANUFACTURING NONAQUEOUS ELECTROLYTE BATTERY, AND NONAQUEOUS ELECTROLYTE BATTERY

(71) Applicant: Panasonic Intellectual Property Management Co., Ltd., Osaka (JP)

(72) Inventors: Takafumi Tsukagoshi, Hyogo (JP); Nobuhiko Hojo, Osaka (JP); Yu Otsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 142 days.

(21) Appl. No.: 14/707,901

(22) Filed: May 8, 2015

(65) Prior Publication Data
US 2015/0244020 A1 Aug. 27, 2015

Related U.S. Application Data

(63) Continuation of application No. PCT/JP2013/006619, filed on Nov. 11, 2013.

(30) Foreign Application Priority Data

Nov. 12, 2012 (JP) .................... 2012-248495

(51) Int. Cl.
*H01M 4/04* (2006.01)
*H01M 10/052* (2010.01)
(Continued)

(52) U.S. Cl.
CPC ......... *H01M 10/052* (2013.01); *H01M 4/049* (2013.01); *H01M 4/0423* (2013.01);
(Continued)

(58) Field of Classification Search
CPC .. H01M 4/1395; H01M 4/0423; H01M 4/386; H01M 10/052; H01M 4/5835
See application file for complete search history.

(56) References Cited

U.S. PATENT DOCUMENTS 5,443,930 A 8/1995 Shoji et al.
8,173,303 B2 5/2012 Cho et al.
(Continued)

FOREIGN PATENT DOCUMENTS

JP 07-050165 A 2/1995
JP 2000-182602 A 6/2000
(Continued)

OTHER PUBLICATIONS

International Search Report issued in PCT/JP2013/006619, dated Feb. 4, 2014, with English translation.

*Primary Examiner* — Mark F Huff
*Assistant Examiner* — Monique Wills
(74) *Attorney, Agent, or Firm* — McDermott Will & Emery LLP

(57) ABSTRACT

A negative electrode active material layer containing at least one selected from silicon and a silicon compound as a negative electrode active material is formed, and an amount of lithium exceeding an amount corresponding to a theoretical capacity of the negative electrode active material layer is brought into contact with the negative electrode active material layer so as to prepare a negative electrode. A positive electrode containing a lithium-absorption material capable of irreversibly absorbing lithium is prepared. The positive electrode, the negative electrode, a separator, and a nonaqueous electrolyte are enclosed inside an outer enclosure. A chemical conversion treatment of the negative electrode active material is performed with the lithium brought into contact with the negative electrode active material layer.

10 Claims, 3 Drawing Sheets

(51) Int. Cl.
  *H01M 4/1395* (2010.01)
  *H01M 4/1393* (2010.01)
  *H01M 4/36* (2006.01)
  *H01M 4/38* (2006.01)
  *H01M 4/48* (2010.01)
  *H01M 4/583* (2010.01)
  *H01M 4/139* (2010.01)
  *H01M 10/04* (2006.01)
  *H01M 10/0525* (2010.01)

(52) U.S. Cl.
  CPC ......... *H01M 4/139* (2013.01); *H01M 4/1393* (2013.01); *H01M 4/1395* (2013.01); *H01M 4/366* (2013.01); *H01M 4/386* (2013.01); *H01M 4/483* (2013.01); *H01M 4/5835* (2013.01); *H01M 10/049* (2013.01); *H01M 10/0525* (2013.01); *Y10T 29/49108* (2015.01); *Y10T 29/49115* (2015.01)

(56) References Cited

U.S. PATENT DOCUMENTS

| | | | |
|---|---|---|---|
| 8,603,196 B2 | 12/2013 | Yagi et al. | |
| 2010/0173198 A1* | 7/2010 | Zhamu | H01M 4/134 429/222 |
| 2010/0330430 A1 | 12/2010 | Chung et al. | |
| 2011/0179637 A1* | 7/2011 | Eberman | A61N 1/378 29/623.5 |
| 2012/0007560 A1* | 1/2012 | Smart | H01M 4/386 320/127 |

FOREIGN PATENT DOCUMENTS

| | | |
|---|---|---|
| JP | 2003-115327 A | 4/2003 |
| JP | 2005-317551 A | 11/2005 |
| JP | 2007-299801 A | 11/2007 |
| JP | 2011-054324 A | 3/2011 |
| WO | 2010-016217 A1 | 2/2010 |
| WO | 2010-137862 A2 | 12/2010 |

* cited by examiner

METHOD FOR MANUFACTURING NONAQUEOUS ELECTROLYTE BATTERY, AND NONAQUEOUS ELECTROLYTE BATTERY

This is a continuation of International Application No. PCT/JP2013/006619, with an international filing date of Nov. 11, 2013, which claims the foreign priority of Japanese Patent Application No. 2012-248495, filed on Nov. 12, 2012, the entire contents of both of which are hereby incorporated by reference.

BACKGROUND OF THE INVENTION

1. Field of the Invention

The present disclosure relates to methods for manufacturing nonaqueous electrolyte batteries and to nonaqueous electrolyte batteries.

2. Description of Related Art

Nonaqueous electrolyte batteries such as lithium secondary batteries have been widely used as power sources for portable electronic devices. Many techniques for improvement in various characteristics of nonaqueous electrolyte batteries have been proposed.

JP 2007-299801 A discloses an energy storage device in which activated carbon is used as a positive electrode active material and in which silicon or a silicon compound having beforehand absorbed an amount of lithium corresponding to 35% or more of a theoretical capacity is used as a negative electrode active material. It is disclosed that the amount of absorbed lithium is preferably 50% or more. It is also disclosed that the amount of absorbed lithium is 90% or less, and preferably 80% or less.

JP 2003-115327 A discloses a nonaqueous electrolyte secondary battery in which a metallic lithium foil or a metallic lithium alloy foil is attached to the surface of the negative electrode and in which a fluorocarbon that irreversibly reacts with lithium ions at a voltage of 1 V or more and less than 3.5 V is mixed in with the positive electrode.

SUMMARY OF THE INVENTION

One of the features required of nonaqueous electrolyte batteries is large-current discharge characteristics (pulse discharge characteristics) for a short duration of several seconds or of one second or less. However, findings on a specific structure and manufacturing method of nonaqueous electrolyte batteries having good pulse discharge characteristics have still remained inadequate. One non-limiting and exemplary embodiment provides an improvement in pulse discharge characteristics of nonaqueous electrolyte batteries.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a method for manufacturing a negative electrode, the method including:

a negative electrode preparation step of forming a negative electrode active material layer containing at least one selected from silicon and a silicon compound as a negative electrode active material, and bringing an amount of lithium into contact with the negative electrode active material layer so as to prepare a negative electrode, the amount of lithium exceeding an amount corresponding to a theoretical capacity of the negative electrode active material layer; and a negative electrode chemical conversion step of performing a chemical conversion treatment of the negative electrode active material with the lithium brought into contact with the negative electrode active material layer.

With the use of a negative electrode manufactured by the above method, a nonaqueous electrolyte battery having excellent pulse discharge characteristics can be provided.

DETAILED DESCRIPTION

Figure 1:
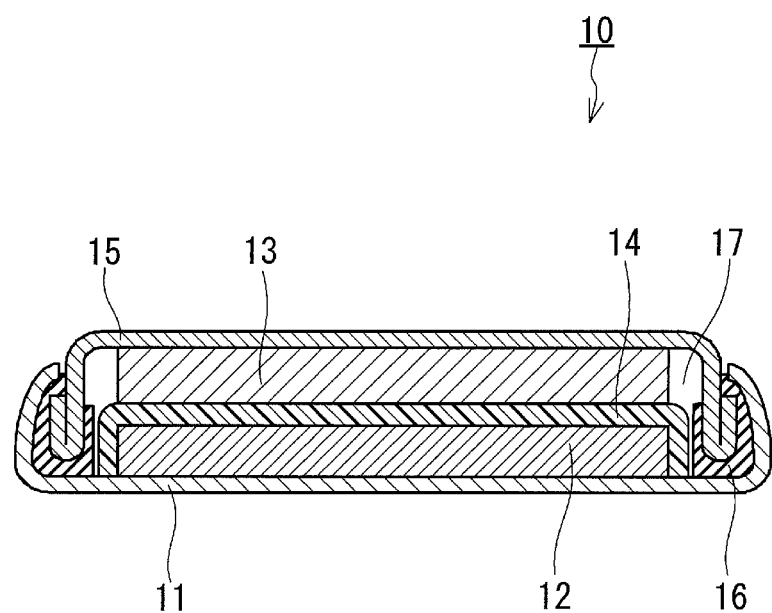
FIG. 1 is a cross-sectional view of a coin battery that is an embodiment of a nonaqueous electrolyte battery.

The present inventors made a detailed study of the pulse discharge characteristics of a nonaqueous electrolyte battery including a positive electrode and a negative electrode containing at least one selected from silicon and a silicon compound as a negative electrode active material. As a result, it has become evident that the pulse discharge characteristics of the nonaqueous electrolyte battery can be significantly improved when an amount of lithium exceeding the amount corresponding to a theoretical capacity of a negative electrode active material layer is brought into contact with the negative electrode active material layer, which is followed by a chemical conversion treatment of the negative electrode active material with the lithium. Particularly, it has become evident that the use of the technique disclosed in the present specification for a nonaqueous electrolyte secondary battery makes it possible to ensure the above effect continuously even after repeated charge and discharge.

That is, a first aspect of the present disclosure provides a method for manufacturing a nonaqueous electrolyte battery, the method including:

a negative electrode preparation step of forming a negative electrode active material layer containing at least one selected from silicon and a silicon compound as a negative electrode active material, and bringing an amount of lithium into contact with the negative electrode active material layer so as to prepare a negative electrode, the amount of lithium exceeding an amount corresponding to a theoretical capacity of the negative electrode active material layer;

a positive electrode preparation step of preparing a positive electrode containing a lithium-absorption material capable of irreversibly absorbing lithium;

an assembling step of enclosing the positive electrode, the negative electrode, a separator, and a nonaqueous electrolyte inside an outer enclosure; and a negative electrode chemical conversion step of performing a chemical conversion treatment of the negative electrode active material with the lithium brought into contact with the negative electrode active material layer.

According to the first aspect, a nonaqueous electrolyte battery having excellent pulse discharge characteristics can be provided.

A second aspect of the present disclosure provides the method for manufacturing a nonaqueous electrolyte battery as set forth in the first aspect, wherein the theoretical capacity of the negative electrode active material layer is a total of a reversible capacity and an irreversible capacity of the negative electrode active material layer, and in the negative electrode preparation step, the amount of lithium brought into contact with the negative electrode active material layer is a total of an amount of lithium corresponding to the theoretical capacity and an amount of lithium corresponding to 5 to 40% of the reversible capacity. When the amount of lithium falls within an appropriate range, the chemical conversion treatment of the negative electrode active material can be reliably carried out, and, therefore, the pulse discharge characteristics of the nonaqueous electrolyte battery can be effectively improved.

A third aspect of the present disclosure provides the method for manufacturing a nonaqueous electrolyte battery as set forth in the first or second aspect, wherein when an amount of lithium calculated by subtracting the amount corresponding to the theoretical capacity from a total amount of lithium brought into contact with the negative electrode active material layer is defined as an excess amount of lithium, the lithium-absorption material contained in the positive electrode is in an amount sufficient to irreversibly absorb all of the excess amount of lithium. According to the third aspect, a secondary battery can be provided for which the likelihood of precipitation of lithium on the negative electrode during charge is reduced and which has excellent charge-discharge cycle characteristics.

A fourth aspect of the present disclosure provides the method for manufacturing a nonaqueous electrolyte battery as set forth in any one of the first to third aspects, wherein the negative electrode chemical conversion step is a step of keeping the negative electrode in contact with the nonaqueous electrolyte or another nonaqueous electrolyte for a period of time. This method is superior in that it does not require any special technique and is simple.

A fifth aspect of the present disclosure provides the method for manufacturing a nonaqueous electrolyte battery as set forth in the fourth aspect, wherein in the negative electrode chemical conversion step, the negative electrode is heated. A sixth aspect of the present disclosure provides the method for manufacturing a nonaqueous electrolyte battery as set forth in the fifth aspect, wherein the negative electrode is heated by placing the negative electrode in an environment having a temperature of 40 to 80° C. With these features, the chemical conversion treatment of the negative electrode active material can be promoted and reliably completed.

A seventh aspect of the present disclosure provides the method for manufacturing a nonaqueous electrolyte battery as set forth in any one of the first to third aspects, wherein the negative electrode preparation step includes a vapor deposition step of vapor-depositing lithium on the negative electrode active material layer, and the negative electrode chemical conversion step proceeds simultaneously with the vapor deposition step. According to the seventh aspect, since the number of steps is reduced substantially by one, an increase in productivity can be expected.

An eighth aspect of the present disclosure provides the method for manufacturing a nonaqueous electrolyte battery as set forth in any one of the first to seventh aspects, the method further including a discharge step of allowing the lithium-absorption material of the positive electrode to absorb excess lithium brought into contact with the negative electrode active material layer over the amount corresponding to the theoretical capacity. According to the eighth aspect, a secondary battery can be provided for which the likelihood of precipitation of lithium on the negative electrode during charge is reduced and which has excellent charge-discharge cycle characteristics.

A ninth aspect of the present disclosure provides the method for manufacturing a nonaqueous electrolyte battery as set forth in any one of the first to eighth aspects, wherein the positive electrode further contains a positive electrode active material capable of reversibly absorbing and releasing lithium, and in the positive electrode preparation step, a material having room for absorption of lithium is used as the positive electrode active material. According to the ninth aspect, a nonaqueous electrolyte battery having a high energy density can be obtained.

A tenth aspect of the present disclosure provides the method for manufacturing a nonaqueous electrolyte battery as set forth in any one of the first to eighth aspects, wherein the positive electrode further contains a positive electrode active material capable of reversibly absorbing and releasing lithium, and in the positive electrode preparation step, a vanadium oxide is used as the positive electrode active material. According to the tenth aspect, a nonaqueous electrolyte battery that has a voltage of the order of 3 V and a high energy density and that is excellent in cycle characteristics can be obtained.

An eleventh aspect of the present disclosure provides the method for manufacturing a nonaqueous electrolyte battery as set forth in any one of the first to tenth aspects, wherein the positive electrode further contains a positive electrode active material capable of reversibly absorbing and releasing lithium, and the lithium-absorption material is graphite fluoride. Graphite fluoride has a very high ability to irreversibly absorb lithium. Therefore, a large amount of lithium can be absorbed into a small amount of the lithium-absorption material, and, consequently, the decrease in energy density due to the lithium-absorption material being contained in the positive electrode can be minimized. In addition, graphite fluoride produces highly-conductive carbon after absorbing lithium, and thus contributes to an increase in reactivity of the positive electrode active material.

A twelfth aspect of the present disclosure provides a nonaqueous electrolyte battery manufactured by the method as set forth in any one of the first to eleventh aspects.

A thirteenth aspect of the present disclosure provides a nonaqueous electrolyte secondary battery including:

a positive electrode containing a positive electrode active material capable of reversibly absorbing and releasing lithium and a lithium-absorption material capable of irreversibly absorbing lithium; and a negative electrode containing at least one selected from silicon and a silicon compound as a negative electrode active material, wherein when the nonaqueous electrolyte secondary battery is fully charged, a total of an amount of lithium absorbed in the negative electrode active material and an amount of lithium absorbed in the lithium-absorption material exceeds an amount of lithium corresponding to a theoretical capacity of the negative electrode.

A fourteenth aspect of the present disclosure provides the nonaqueous electrolyte secondary battery as set forth in the thirteenth aspect, wherein the positive electrode active material is a vanadium oxide. According to the fourteenth aspect, a nonaqueous electrolyte battery that has a voltage of the order of 3 V and a high energy density and that is excellent in cycle characteristics can be obtained.

A fifteenth aspect of the present disclosure provides a method for manufacturing a negative electrode, the method including:

a negative electrode preparation step of forming a negative electrode active material layer containing at least one selected from silicon and a silicon compound as a negative electrode active material, and bringing an amount of lithium into contact with the negative electrode active material layer so as to prepare a negative electrode, the amount of lithium exceeding an amount corresponding to a theoretical capacity of the negative electrode active material layer; and a negative electrode chemical conversion step of performing a chemical conversion treatment of the negative electrode active material with the lithium brought into contact with the negative electrode active material layer.

A sixteenth aspect of the present disclosure provides a method for manufacturing a nonaqueous electrolyte primary battery, the method including:

a negative electrode preparation step of forming a negative electrode active material layer containing at least one selected from silicon and a silicon compound as a negative electrode active material, and bringing an amount of lithium into contact with the negative electrode active material layer so as to prepare a negative electrode, the amount of lithium exceeding an amount corresponding to a theoretical capacity of the negative electrode active material layer;

a positive electrode preparation step of preparing a positive electrode containing a positive electrode active material capable of absorbing lithium;

an assembling step of enclosing the positive electrode, the negative electrode, a separator, and a nonaqueous electrolyte inside an outer enclosure; and a negative electrode chemical conversion step of performing a chemical conversion treatment of the negative electrode active material with the lithium brought into contact with the negative electrode active material layer.

Hereinafter, embodiments of the present disclosure will be described with reference to the drawings. It should be noted that the scope of the present disclosure is not limited by the embodiments described below.

As shown in FIG. 1, a coin battery 10 of the present embodiment has a structure whose interior is sealed by a coin-shaped casing 11, a cover plate 15, and a gasket 16. A positive electrode 12, a negative electrode 13, and a separator 14 are placed in the interior of the coin battery 10. The separator 14 is disposed between the positive electrode 12 and the negative electrode 13. The positive electrode 12 and the negative electrode 13 face each other across the separator 14. The electrode assembly constituted by the positive electrode 12, the negative electrode 13, and the separator 14 is impregnated with a nonaqueous electrolyte solution 17 (a nonaqueous electrolyte in liquid form).

A method for manufacturing a nonaqueous electrolyte secondary battery as typified by the coin battery 10 will be described.

(1) Negative Electrode Preparation Step

First, a negative electrode active material layer containing a negative electrode active material is formed on a negative electrode current collector. At least one selected from the group consisting of silicon and a silicon compound can be used as the negative electrode active material. Examples of the silicon compound include a Ti—Si alloy, silicon oxide, and silicon nitride. For the Ti—Si alloy, the composition ratio Ti:Si between Ti and Si is, for example, in the range of 10:90 to 45:55. A material commonly known as a negative electrode current collector for nonaqueous electrolyte secondary batteries can be used as the negative electrode current collector. Specifically, a metal foil or mesh made of a metal such as copper, nickel, and stainless steel can be used. The negative electrode current collector can be omitted when the cover plate 15 serves as a negative electrode current collector as described with reference to FIG. 1.

The method for forming the negative electrode active material layer on the negative electrode current collector is not particularly limited, and a commonly-known wet film formation method or a commonly-known dry film formation method can be employed. Examples of the dry film formation method include vacuum deposition, chemical vapor deposition, sputtering, and powder molding. An example of the wet film formation method is one in which a slurry containing the negative electrode active material is applied onto the negative electrode current collector by a technique such as a doctor blade technique. The negative electrode can be fabricated also by forming a self-supporting negative electrode active material layer (for example, a negative electrode active material layer in pellet form), and then pressure-bonding the negative electrode active material layer and a negative electrode current collector together. The form of the negative electrode active material is not particularly limited either. The negative electrode active material may be in the form of particles or may be in the form of a thin film.

The negative electrode active material layer may consist essentially of a negative electrode active material or may contain, as appropriate, an additive such as a conductive additive for augmenting the electron conductivity and a binder for keeping the shape of the negative electrode active material layer. Various electron-conductive materials that do not undergo any chemical change at the charge-discharge potential of the negative electrode active material can be used as the conductive additive. Specifically, the same materials as those usable in the positive electrode can be used. As the binder, the same materials as binders usable in the positive electrode can be used. It should be noted that when the "negative electrode active material layer consists essentially of a negative electrode active material", this means that any other material than the negative electrode active material has not been purposefully added to the negative electrode active material layer.

Figure 2:
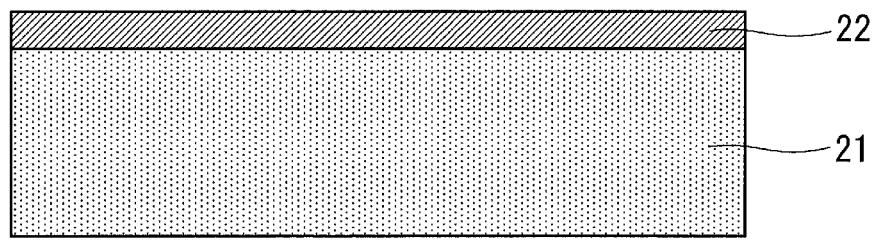
FIG. 2 is a cross-sectional view of a negative electrode fabricated through a negative electrode preparation step.

Next, as shown in FIG. 2, a lithium layer 22 is formed on the negative electrode active material layer 21. The shape of the lithium layer 22 and the method for forming the lithium layer 22 are not particularly limited. For example, the lithium layer 22 can be formed by attaching a lithium foil to the negative electrode active material layer 21. Alternatively, the lithium layer 22 can be formed on the negative electrode active material layer 21 by vapor deposition (desirably by vacuum deposition).

The amount of lithium in the lithium layer should be appropriately controlled. The lithium layer contains lithium in excess of the amount of lithium corresponding to the theoretical capacity of the negative electrode active material layer. Specifically, the lithium layer contains lithium in an amount that is the total of the amount of lithium corresponding to the theoretical capacity and the amount of lithium corresponding to 5 to 40% (desirably, 15 to 40%) of the reversible capacity. When the amount of lithium in the lithium layer falls within the appropriate range, the chemical conversion treatment of the negative electrode active material can be reliably carried out as described later, and accordingly the pulse discharge characteristics of the nonaqueous electrolyte secondary battery can be effectively improved. Furthermore, as described later, an excessive increase in the amount of a lithium-absorption material of the positive electrode can be avoided, and accordingly a nonaqueous electrolyte secondary battery having a high energy density can be obtained. It should be noted that the "theoretical capacity of the negative electrode active material layer" means the total of the reversible capacity and the irreversible capacity of the negative electrode active material layer. The irreversible capacity is, for example, about 10 to 50% of the theoretical capacity.

In terms of proper control of the amount of lithium in the lithium layer, the method of forming the lithium layer by attaching a lithium foil to the negative electrode active material layer is desirable. In terms of productivity, however, the method of forming the lithium layer by vapor-depositing lithium on the negative electrode active material layer is desirable. This is because the chemical conversion treatment of the negative electrode active material can be done by heat during the vapor deposition, simultaneously with the formation of the lithium layer.

(2) Negative Electrode Chemical Conversion Step

Next, the chemical conversion treatment of the negative electrode active material is performed with the lithium brought into contact with the negative electrode active material layer. An example of the method for the chemical conversion treatment is a method in which the negative electrode is immersed in a nonaqueous electrolyte solution, with the negative electrode active material layer and the lithium being electrically shorted, so that the reactivity between the lithium and the negative electrode active material is increased. In other words, the negative electrode chemical conversion step is a step of keeping the negative electrode in contact with the nonaqueous electrolyte solution for a period of time. This method is superior in that it does not require any special technique and is simple. In the present specification, the term "chemical conversion" is used broadly to mean altering the properties of a material from one state to another by chemical action.

When the lithium layer is formed by a method other than vapor deposition, the chemical conversion treatment of the negative electrode active material is desirably carried out after the electrode assembly constituted by the positive electrode, the negative electrode, and the separator is enclosed inside the outer enclosure of the battery together with the nonaqueous electrolyte solution. This is because, with the outer enclosure being sealed, the negative electrode active material and the nonaqueous electrolyte solution can be prevented from reacting with oxygen in the air during the chemical conversion treatment.

The chemical conversion treatment is automatically completed at the point when a period of time has elapsed after the electrode assembly is enclosed inside the outer enclosure of the battery together with the nonaqueous electrolyte solution. That is, while the assembled battery is left in an open-circuit condition for a period of time, the chemical conversion treatment spontaneously proceeds and is completed. Obviously, the period of time required for the chemical conversion treatment can be determined by the process below. Immediately after the onset of the chemical conversion treatment, the battery exhibits a high open-circuit voltage because the potential of the negative electrode is dominated by the potential of lithium contained in the lithium layer. As the chemical conversion treatment progresses, lithium is sufficiently absorbed into the negative electrode active material layer, and the open-circuit voltage of the battery decreases. The end of the chemical conversion treatment can be determined by the convergence of the open-circuit voltage of the battery to a certain value. The period of time is, for example, about 12 hours to 3 days at a temperature of 45° C.

In the negative electrode chemical conversion step, the negative electrode may be heated. For example, the negative electrode is placed in an environment having a temperature higher than room temperature, with the negative electrode kept in contact with the nonaqueous electrolyte solution. Specifically, the negative electrode is heated by placing the negative electrode in an environment having a temperature of 40 to 80° C. This makes it possible to promote the chemical conversion treatment of the negative electrode active material and to reliably complete the chemical conversion treatment of the negative electrode active material.

When the lithium layer is formed by vapor deposition, the negative electrode chemical conversion step can be carried out before the positive electrode, the negative electrode, and the separator are combined to form the electrode assembly. That is, when the lithium layer is formed by vapor deposition, heat during the vapor deposition allows the chemical conversion treatment of the negative electrode active material to proceed along with the formation of the lithium layer. The negative electrode chemical conversion step proceeds simultaneously with the vapor deposition step. Since the number of steps is reduced substantially by one, an increase in productivity can be expected. It may happen that the chemical conversion treatment is not fully completed by heat during the vapor deposition, and is stopped halfway. In this case, the chemical conversion treatment may be completed by additionally heating the negative electrode. However, considering the fact that the chemical conversion treatment spontaneously proceeds after assembling of the battery, the additional heating may be unnecessary.

Also when the lithium layer is formed by a method other than vapor deposition, the negative electrode chemical conversion step can be carried out before the electrode assembly is formed. For example, the chemical conversion treatment of the negative electrode active material can be carried out by immersing the negative electrode obtained through the negative electrode preparation step in an arbitrarily selected nonaqueous electrolyte solution. The arbitrarily selected nonaqueous electrolyte solution may have a composition identical to or different from that of the nonaqueous electrolyte solution of the nonaqueous electrolyte secondary battery.

In addition, when the negative electrode is fabricated by pressure-bonding a self-supporting negative electrode active material layer to a negative electrode current collector, the chemical conversion treatment of the negative electrode active material can be carried out before the negative electrode active material layer is pressure-bonded to the negative electrode current collector. Furthermore, the chemical conversion treatment of the negative electrode active material can be carried out also by heating the negative electrode active material layer to a sufficiently high temperature (for example, a temperature higher than the melting point of lithium) with lithium kept in contact with the negative electrode active material layer.

As can be understood from the foregoing description, there is not any particular limitation on when the negative electrode chemical conversion step is carried out. The positive electrode preparation step, the negative electrode chemical conversion step, and the battery assembling step may be performed in any order.

(3) Positive Electrode Preparation Step

In the positive electrode preparation step, there is prepared a positive electrode containing a positive electrode active material capable of reversibly absorbing and releasing lithium ions and a lithium-absorption material capable of irreversibly absorbing lithium. Specifically, a positive electrode active material layer containing the positive electrode active material and the lithium-absorption material is formed on a positive electrode current collector. A material commonly known as a positive electrode active material for nonaqueous electrolyte secondary batteries can be used as the positive electrode active material. Typically, a transition metal oxide can be used. Transition metal oxides containing lithium include lithium cobalt oxide, lithium nickel oxide, lithium manganese oxide, mixtures thereof, and composite oxides thereof. Transition metal oxides free from lithium include vanadium oxides such as vanadium pentoxide ($V_2O_5$) and manganese oxides such as manganese dioxide ($MnO_2$). In the present embodiment, the chemical conversion treatment of the negative electrode active material is performed with lithium; therefore, the negative electrode is in a charged state when the battery is assembled. For this reason, a positive electrode active material in a charged state, that is, a material free from lithium is suitably used as the positive electrode active material.

A material commonly known as a positive electrode current collector for nonaqueous electrolyte secondary batteries can be used as the positive electrode current collector. Specifically, a metal foil or a metal mesh made of a metal such as aluminum, carbon, and stainless steel can be used. The method for forming the positive electrode active material layer on the positive electrode current collector is not particularly limited, and a commonly-known method can be employed as in the case of the negative electrode. The positive electrode current collector can be omitted when the casing 11 serves as a positive electrode current collector as described with reference to FIG. 1.

When a nonaqueous electrolyte secondary battery is manufactured by the method of the present embodiment, the battery is completed with the negative electrode being almost fully charged. Therefore, in order to obtain a nonaqueous electrolyte secondary battery having a high energy density, a material having room for absorption of lithium is desirably used as the positive electrode active material in the positive electrode preparation step. In other words, a material that has released at least some lithium can be used as the positive electrode active material. It is more desirable to use a positive electrode active material that is capable of absorbing and releasing lithium ions but that is free from lithium ions at the time of fabrication of the positive electrode. Examples of such a positive electrode active material include vanadium oxides typified by vanadium pentoxide ($V_2O_5$) and manganese oxides typified by manganese dioxide ($MnO_2$). For example, the energy density of $V_2O_5$ is about 150 mAh/g. The energy density of $MnO_2$ is about 310 mAh/g. With the use of a vanadium oxide or a manganese oxide as the positive electrode active material, it is possible to obtain a nonaqueous electrolyte battery that has a voltage of the order of 3 V and a high energy density and that is excellent in cycle characteristics.

Examples of the lithium-absorption material include halides of carbon, oxides of carbon, halides of transition metals, and oxides of transition metals. Among these candidate materials, a material that irreversibly reacts with lithium ions at a potential that is 1 V or more and less than 3.5 V as determined with respect to the potential of the lithium can be suitably used. A more desirable material that can be used is one that irreversibly reacts with lithium ions at a potential of 2 V or more and less than 3.5 V.

The halides of carbon include graphite fluoride. The oxides of carbon include graphite oxide. The halides of transition metals include copper fluoride ($CuF_2$) and copper chloride ($CuCl_2$). The oxides of transition metals include copper oxide. When the lithium-absorption material has electrical conductivity after having absorbed lithium, the lithium-absorption material can be made to function as a conductive additive, which makes it possible to reduce the amount of an conductive additive other than the lithium-absorption material. That is, the reduction in energy density due to the lithium-absorption material contained in the positive electrode can be minimized. The more lightweight the lithium-absorption material is, the more desirable it is. Graphite fluoride meets these requirements and is therefore suitable as the lithium-absorption material. The energy density of graphite fluoride, although varying according to the number n in $CF_n$, is very large, and ranges from about 800 to 1000 mAh/g.

The amount of the lithium-absorption material in the positive electrode active material layer should be appropriately controlled. Specifically, when an amount of lithium calculated by subtracting the amount corresponding to the theoretical capacity of the negative electrode active material layer from the total amount of lithium brought into contact with the negative electrode active material layer is defined as an excess amount of lithium, it is desirable that the lithium-absorption material contained in the positive electrode be in an amount sufficient to irreversibly absorb all of the excess amount of lithium. In this case, the likelihood of precipitation of lithium on the negative electrode during charge can be reduced. However, when the lithium-absorption material can absorb an amount of lithium that is much larger than the excess amount of lithium, lithium required to participate in reversible charge-discharge reaction is also absorbed into the lithium-absorption material, which leads to a reduction in energy density of the battery. Therefore, it is desirable that the lithium-absorption material contained in the positive electrode be in an amount slightly exceeding the minimum amount required for irreversible absorption of all of the excess amount of lithium. Specifically, the amount of the lithium-absorption material is desirably such that it can absorb lithium in an amount of 100 to 150% with respect to the excess amount of lithium (when the excess amount is defined as 100%). More desirably, the amount of the lithium-absorption material is such that it can absorb lithium in an amount of 100% to 125% with respect to the excess amount of lithium.

In the present specification, the "material capable of irreversibly absorbing lithium" means a material capable of discharge but incapable of charge, that is, a material that can be used as an active material for lithium primary batteries but cannot be used as an active material for lithium secondary batteries. The "positive electrode active material capable of reversibly absorbing and releasing lithium" means a material capable of both discharge and charge, that is, a positive electrode active material for lithium secondary batteries.

The positive electrode may contain, as appropriate, an additive such as a conductive additive and a binder. Various electron-conductive materials that do not undergo chemical change at the charge-discharge potential of the positive electrode active material can be used as the conductive additive. Specifically, the following can be used: carbon materials such as carbon black and acetylene black; electrically-conductive polymers such as polyaniline, polypyrrole, and polythiophene; electrically-conductive fibers such as carbon fibers and metal fibers; metal powders; electrically-conductive whiskers; and electrically-conductive metal oxides. These materials can be used alone or as a mixture. Examples of the binder include: polyolefin resins such as polyethylene and polypropylene; fluorine resins such as polytetrafluoroethylene (PTFE), polyvinylidene fluoride (PVDF), tetrafluoroethylene-hexafluoropropylene copolymer (FEP), and copolymers thereof; styrene-butadiene rubber; polyacrylic acid; and copolymers of acrylic acid and another monomer. These materials can be used alone or as a mixture.

Figure 3:
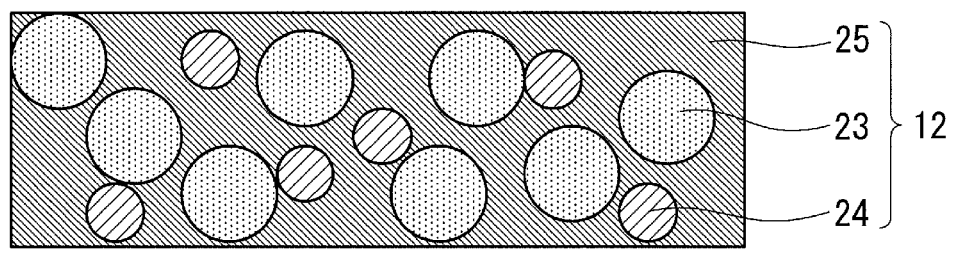
FIG. 3 is a cross-sectional view of a positive electrode fabricated through a positive electrode preparation step.
Figure 4:
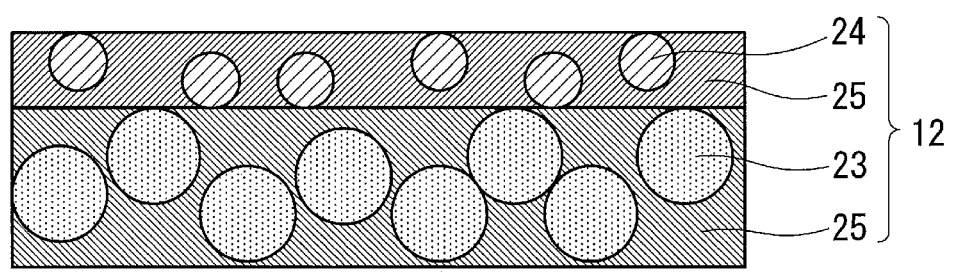
FIG. 4 is a cross-sectional view of another positive electrode fabricated through the positive electrode preparation step.

In the present embodiment, the structure of the positive electrode is not particularly limited. For example, as shown in FIG. 3, the positive electrode active material 23 and the lithium-absorption material 24 may be uniformly distributed over the positive electrode 12. That is, the positive electrode active material 23 and the lithium-absorption material 24 may be uniformly dispersed in a matrix 25. The positive electrode active material 23 and the lithium-absorption material 24 are, for example, in the form of particles. In the nonaqueous electrolyte secondary battery, the matrix 25 is composed of a nonaqueous electrolyte and an additive such as a conductive additive and a binder. As shown in FIG. 4, the positive electrode 12 may have a multilayer structure of a layer containing the positive electrode active material 23 and a layer containing the lithium-absorption material 24.

(4) Assembling Step

In the assembling step, the positive electrode, the negative electrode, and the separator are combined to form an electrode assembly, and the electrode assembly is enclosed inside an outer enclosure together with the nonaqueous electrolyte solution. Thus, a nonaqueous electrolyte secondary battery is obtained. In the battery 10 described with reference to FIG. 1, the outer enclosure of the battery 10 is formed by the coin-shaped casing 11, the cover plate 15, and the gasket 16.

When the negative electrode chemical conversion step needs to be carried out after the assembling step, the nonaqueous electrolyte secondary battery obtained through the assembling step is left in an open-circuit condition for a period of time. In this case, the nonaqueous electrolyte secondary battery may be heated to an appropriate temperature.

The separator is formed of a resin that does not have electron conductivity. The separator is typically a porous membrane having high ion permeability, sufficient mechanical strength, and electrical insulating properties. Polyolefin resins are suitable as the material of the separator, in terms of hydrophobicity and resistance to organic solvents. Specifically, examples of the material include polypropylene, polyethylene, and a combination thereof.

The nonaqueous electrolyte solution is composed of a non-aqueous solvent and a supporting salt dissolved in the non-aqueous solvent. A solvent commonly known in the field of nonaqueous secondary batteries or nonaqueous electric double layer capacitors can be used as the non-aqueous solvent. Specifically, a solvent containing a cyclic carbonate can be suitably used. This is because cyclic carbonates, as typified by ethylene carbonate and propylene carbonate, have a very high relative permittivity. Among cyclic carbonates, propylene carbonate is suitable. This is because propylene carbonate has a freezing point of −49° C. which is lower than that of ethylene carbonate, and allows the nonaqueous electrolyte secondary battery to operate even at low temperatures. In addition, a solvent containing a cyclic ester can also be suitably used. This is because cyclic esters, as typified by γ-butyl lactone, have a very high relative permittivity. The use of a solvent having a high relative permittivity can impart a high permittivity to the nonaqueous electrolyte solution. As the non-aqueous solvent, the above-mentioned materials may be used alone, or a mixture of a plurality of solvents selected from the above-mentioned materials may be used. Other examples of the non-aqueous solvent include chain carbonates, chain esters, and cyclic or chain ethers. Specifically, dimethyl carbonate, diethyl carbonate, methyl ethyl carbonate, tetrahydrofuran, dioxolan, sulfolane, dimethylformamide, acetonitrile, dimethyl sulfoxide, and the like, can be used.

The type of the supporting salt is not particularly limited. For example, supporting salts composed of any of the below-mentioned anions and lithium ion can be used. Examples of the anion include halide anion, perchlorate acid anion, trifluoromethanesulfonate anion, tetrafluoroborate anion, trifluorohexafluorophosphate anion, trifluoromethanesulfonate anion, bis(trifluoromethanesulfonyl)imide anion, and bis(perfluoroethylsulfonyl)imide anion. These anions may be used alone, or two or more thereof may be used in combination. Specific examples of the supporting salt include lithium fluoride, lithium chloride, lithium perchlorate, lithium trifluoromethanesulfonate, lithium tetrafluoroborate, lithium bis(trifluoromethylsulfonyl)imide, and lithium thiocyanate.

Through the above steps, a nonaqueous electrolyte secondary battery is obtained. The obtained nonaqueous electrolyte secondary battery is in a fully-charged state. At the first discharge, excess lithium brought into contact with the negative electrode active material layer over the amount corresponding to the theoretical capacity of the negative electrode active material layer is absorbed into the lithium-absorption material of the positive electrode (discharge step). Thus, the likelihood of precipitation of lithium on the negative electrode during charge is reduced. The amount of lithium electrochemically absorbed into the lithium-absorption material (excess amount) is equal to an amount calculated by subtracting the amount of lithium corresponding to the theoretical capacity from the total amount of lithium brought into contact with the negative electrode active material layer. The discharge step of allowing the lithium-absorption material to irreversibly absorb lithium may be performed before the shipment of the nonaqueous electrolyte secondary battery or may be performed simultaneously with discharge in the first use after shipment.

Next, there will be given a description of the reason why a nonaqueous electrolyte secondary battery having excellent output characteristics can be manufactured by the method of the present embodiment. It should be noted that the following findings are based on the inference made by the present inventors as of the filing of the present application.

As shown in FIG. 2, the lithium layer 22 is formed on the negative electrode active material layer 21. In the negative electrode chemical conversion step, the chemical conversion treatment of the negative electrode active material contained in the negative electrode active material layer 21 proceeds by the action of lithium of the lithium layer 22. The lithium layer 22 contains lithium in excess of the amount corresponding to the theoretical capacity of the negative electrode active material layer 21. Therefore, the chemical conversion treatment takes place over the entire negative electrode active material in the negative electrode active material layer 21. In addition, a state is reached in which the entire negative electrode active material has absorbed lithium (a charged state). Therefore, a transfer pathway for lithium is formed in the negative electrode active material layer 21. Consequently, smooth transfer of lithium is made possible, which leads to improved output characteristics of the nonaqueous electrolyte secondary battery.

Generally, the purpose of addition of lithium to the negative electrode or the positive electrode is to preliminarily compensate for lithium ions to be consumed due to the irreversible capacity of the positive electrode or the negative electrode. Insofar as the purpose of lithium addition is only to compensate for the irreversible capacity, it is inconceivable to add lithium to the negative electrode or the positive electrode in excess of the amount corresponding to the theoretical capacity. In this respect, there is a difference from the method of the present embodiment. Obviously, according to the present embodiment, the irreversible capacity of the negative electrode is also compensated for.

According to the present embodiment, no residual lithium is present on the negative electrode active material layer of the nonaqueous electrolyte secondary battery. The excess lithium is absorbed in the lithium-absorption material. Therefore, it is possible to examine, based on the reversible capacity of the positive electrode, the reversible capacity of the negative electrode, and the total amount of lithium contained in the battery, whether the lithium layer formed on the negative electrode active material layer initially contained lithium in excess of the amount of lithium corresponding to the theoretical capacity of the negative electrode active material layer.

Specifically, the reversible capacity of the positive electrode and the reversible capacity of the negative electrode are determined by single electrode measurement. The compositions of the positive electrode and the negative electrode in the charged state are analyzed to determine the amounts of lithium contained in the positive electrode and the negative electrode. By adding the amount of lithium contained in the positive electrode to the amount of lithium corresponding to the reversible capacity of the negative electrode, the amount of lithium contained in the positive electrode in the discharged state can be determined. The amount of the excess lithium contained in the positive electrode is determined by subtracting, from the amount of lithium contained in the positive electrode in the discharged state, the maximum amount of lithium that can be possessed by the positive electrode active material capable of charge and discharge. By adding the determined amount of the excess lithium to the amount of lithium contained in the negative electrode in the charged state, the amount of lithium contained in the lithium layer formed on the negative electrode active material layer in the course of manufacturing the nonaqueous electrolyte secondary battery can be determined. Furthermore, the proportion of the amount of the excess lithium to the amount corresponding to the reversible capacity of the negative electrode can be calculated from the amount of lithium contained in the lithium layer formed on the negative electrode active material layer and from the discharge capacity determined by single electrode measurement. The amount of the excess lithium contained in the positive electrode corresponds to the lithium absorption capacity of the lithium-absorption material contained in the positive electrode. Therefore, it is possible to determine the proportion of the amount of the excess lithium in the lithium layer formed on the negative electrode active material layer to the amount corresponding to the lithium absorption capacity of the lithium-absorption material contained in the positive electrode. Furthermore, by evaluating the capacity of the negative electrode before the lithium-absorption material absorbs lithium, it is possible to find whether there is excess lithium, and if any, to find the amount of the excess lithium.

For example, when the nonaqueous electrolyte secondary battery is fully charged, the total of the amount of lithium (the number of lithium atoms) absorbed in the negative electrode active material and the amount of lithium (the number of lithium atoms) absorbed in the lithium-absorption material exceeds the amount of lithium (the number of lithium atoms) corresponding to the theoretical capacity of the negative electrode.

The technique disclosed in the present embodiment can be applied to nonaqueous electrolyte primary batteries. The previously described steps, (1) the negative electrode preparation step, (2) the negative electrode chemical conversion step, and (4) the assembling step can be applied, without any change, to a method for manufacturing a nonaqueous electrolyte primary battery. The difference between nonaqueous electrolyte primary batteries and nonaqueous electrolyte secondary batteries lies in the material of their positive electrodes. For a nonaqueous electrolyte primary battery, a positive electrode containing a positive electrode active material capable of absorbing lithium is prepared in the positive electrode preparation step. For example, a positive electrode active material layer is formed on a positive electrode current collector. A material commonly known as a positive electrode active material for nonaqueous electrolyte primary batteries can be used as the positive electrode active material. Typically, the use of graphite fluoride, thionyl chloride, or the like, is possible. That is, for a nonaqueous electrolyte primary battery, it is not necessary to use different materials as the lithium-absorption material and the positive electrode active material. However, the lithium-absorption material may be different from the positive electrode active material.

EXAMPLES (Sample 1)

A nonaqueous electrolyte secondary battery of Sample 1 was fabricated by the procedures described below. In Sample 1, the excess amount was set to 8.4% of the reversible capacity. As previously described, the "excess amount" is calculated by subtracting the amount of lithium corresponding to the theoretical capacity from the total amount of lithium brought into contact with the negative electrode active material layer.

First, a negative electrode was fabricated by the following procedures. A Ti—Si alloy as a negative electrode active material was fabricated by mechanical alloying. Specifically, Ti and Si were put into a vibration ball mill at a mass ratio of 36:64 together with stainless steel balls having a diameter of 15 mm. The inner atmosphere of the vibration ball mill was replaced with argon, and maintained at 1 atm. The mechanical alloying was performed for 80 hours by the vibration ball mill driven at an amplitude of 8 mm and a rotating speed of 1200 rpm. As a result, an alloy powder having an average particle diameter of 10 μm was obtained.

Next, the Ti—Si alloy, a conductive agent, and a binder were mixed at a mass ratio of 100:30:10 in terms of solid content, and thus a paste was obtained. An aqueous solution of a non-crosslinked polyacrylic acid having a weight-average molecular weight of 150,000 (manufactured by Wako Pure Chemical Industries, Ltd.) was used as the binder. Graphite (manufactured by Nippon Graphite Industries, ltd.) having an average particle diameter of 10 μm was used as the conductive agent. The obtained paste was formed into a circular pellet having a diameter of 15.0 mm and a thickness of 0.05 mm. The pellet was dried at 160° C. for 12 hours to obtain a negative electrode active material layer. A lithium foil having a thickness of 0.10 mm was attached to this negative electrode active material layer. Thus, the negative electrode was obtained.

Additionally, the negative electrode active material layer of Sample 1 (without any attached lithium foil) and a lithium foil serving as a counter electrode were used to fabricate a coin battery. The capacity (reversible discharge capacity) of this coin battery was 23 mAh. The capacity was measured by performing a constant-current charge-discharge test in which the discharge voltage upper limit was set at 0.8 V, the charge voltage lower limit was set at 0 V, and the current value was set at 2.0 mA.

Next, a positive electrode was fabricated by the following procedures. An amount of 180 mg of $V_2O_5$ (manufactured by Aldrich Co., LLC.) and 10 mg of acetylene black (Denka Black manufactured by Denki Kagaku Kogyo K.K.) serving as a conductive additive were weighed out. These were put into a mortar and kneaded. To the obtained mixture was added a dispersion (manufactured by DAIKIN INDUSTRIES, LTD.) containing 10 mg of PTFE as a binder. The resulting mixture was kneaded in the mortal and dried. The thus-obtained composite material was subjected to compression molding at a pressure of 10 MPa using a $\phi$016 mm powder compression molding machine, so that a pellet having a thickness of 0.6 mm was fabricated. The pellet was dried by hot air of 200° C. in order to remove the residual moisture from the pellet. Next, 14 mg of graphite fluoride (manufactured by Aldrich Co., LLC.) and 1 mg of polyvinylidene fluoride were dispersed and dissolved in 50 mg of N-methylpyrrolidone (manufactured by Wako Pure Chemical Industries, Ltd.) to obtain a paste. The paste was applied to the surface of the pellet by spin coating. The coating film was vacuum-dried at 120° C. for 1 hour to remove the solvent from the coating film. Thus, the positive electrode was obtained.

A nonaqueous electrolyte secondary battery was fabricated using the above negative and positive electrodes. Propylene carbonate (PC), ethylene carbonate (EC), and dimethoxyethane (DME) were mixed at a volume ratio of 2:1:2 to obtain a solvent. Lithium bis(trifluoromethanesulfonyl)imide was dissolved in the solvent at a concentration of 1 mol/L to obtain a nonaqueous electrolyte solution. The positive electrode, the negative electrode, and a separator were impregnated with the nonaqueous electrolyte solution. A multilayer sheet composed of a porous polyethylene sheet (with a thickness of 20 µm) and a polypropylene non-woven fabric (with a thickness of 160 µm) was used as the separator. The positive electrode, the separator, and the negative electrode were arranged in this order on a coin-shaped casing. A cover plate fitted with a gasket was placed over the coin-shaped casing, and the coin-shaped casing was swaged by a press machine. In this manner, a coin battery (nonaqueous electrolyte secondary battery) was obtained. At that point, the chemical conversion treatment of the negative electrode active material had not progressed sufficiently.

Next, the coin battery was stored in a constant-temperature chamber at 45° C. for 3 days in order to promote the chemical conversion treatment of the negative electrode active material. The end of the chemical conversion treatment was confirmed by the fact that the open-circuit voltage of the coin battery became constant.

Thereafter, the excess lithium was absorbed into graphite fluoride of the positive electrode. Specifically, the coin battery was discharged under a constant-current condition where the discharge voltage lower limit was set at 1.5 V and the current value was set at 2.6 mA.

(Sample 2)

In Sample 2, the excess amount was set to 19.5% of the reversible capacity. Specifically, a coin battery was fabricated in the same manner as in Sample 1, except that the thickness of the lithium foil attached to the negative electrode active material layer was 0.11 mm and that the amount of graphite fluoride contained in the positive electrode was 33 mg.

(Sample 3)

In Sample 3, the excess amount was set to 36.0% of the reversible capacity. Specifically, a coin battery was fabricated in the same manner as in Sample 1, except that the thickness of the lithium foil attached to the negative electrode active material layer was 0.12 mm and that the amount of graphite fluoride contained in the positive electrode was 66 mg.

(Sample 4)

In Sample 4, a lithium foil containing lithium in an amount corresponding to 96.0% of the theoretical capacity of the negative electrode active material layer was attached onto the negative electrode active material layer. Specifically, a coin battery was fabricated in the same manner as in Sample 1, except that the thickness of the lithium foil attached to the negative electrode active material layer was 0.092 mm and that graphite fluoride was not used in the positive electrode.

(Sample 5)

In Sample 5, a lithium foil containing lithium in an amount corresponding to 100.1% of the theoretical capacity of the negative electrode active material layer was attached onto the negative electrode active material layer. Specifically, a coin battery was fabricated in the same manner as in Sample 1, except that the thickness of the lithium foil attached to the negative electrode active material layer was 0.095 mm and that graphite fluoride was not used in the positive electrode.

(Sample 6)

In Sample 6, the excess amount was set to 19.5% of the reversible capacity. Specifically, a coin battery was fabricated in the same manner as in Sample 1, except that the thickness of the lithium foil attached to the negative electrode active material layer was 0.11 mm and that graphite fluoride was not used in the positive electrode. Instead of graphite fluoride not being contained, the amount of the positive electrode active material ($V_2O_5$) was increased to 210 mg, and the thickness of the positive electrode (pellet) was set to 0.7 mm.

(Evaluation of Characteristics of Nonaqueous Electrolyte Secondary Battery)

The capacity and output characteristics of each of the batteries of Samples 1 to 6 were evaluated. The mode of charge in the capacity measurement was constant-current/constant-voltage charge in which the charge voltage upper limit was set at 3.4 V, the constant current value was set at 2.6 mA, and the current value lower limit was set at 0.1 mA. The mode of discharge in the capacity measurement was one in which the discharge voltage lower limit was set at 1.5 V and the current value was set at 2.6 mA. The output characteristics were evaluated using a closed-circuit voltage as measured in pulse discharge at −20° C. Specifically, constant-current charge was performed at 25° C. with the charge voltage upper limit set at 3.4 V and the current value set at 2.6 mA (the same conditions as those for the capacity measurement), then discharge was performed in a constant-temperature chamber at −20° C. for 1 second with the current value set at 20 mA, and the closed-circuit voltage at the end of the 1-second discharge was measured. Additionally, the battery whose output characteristics were evaluated was charged again under the above conditions, the battery fully charged was disassembled, and the presence or absence of residual lithium on the negative electrode active material layer was inspected by visual observation. The results are shown in Table 1.

TABLE 1

| | Details of sample | | | Evaluation result | | |
|---|---|---|---|---|---|---|
| | Amount of lithium contained in lithium foil [% vs. theoretical capacity of negative electrode] | Excess amount of lithium [% vs. reversible capacity of negative electrode] | Amount of lithium-absorption material [% vs. excess amount of lithium] | Capacity [mAh] | Output [V] | Residual lithium |
| Sample 1 | 106.4 | 8.4 | 106.0 | 22.6 | 2.21 | Absent |
| Sample 2 | 114.7 | 19.5 | 108.3 | 22.6 | 2.45 | Absent |
| Sample 3 | 127.2 | 36.0 | 117.0 | 22.6 | 2.49 | Absent |
| Sample 4 | 96.0 | — | — | 21.4 | 2.04 | Absent |
| Sample 5 | 100.1 | — | — | 22.6 | 2.06 | Absent |
| Sample 6 | 114.7 | 19.5 | — | 27.1 | 2.47 | Present |

As shown in Table 1, the batteries of Samples 1 to 3 and 6 exhibited a high closed-circuit voltage in the pulse discharge. This result indicates that nonaqueous electrolyte secondary batteries having a reduced internal resistance for pulse discharge and having excellent output characteristics were obtained. This effect was prominently seen in Samples 2, 3, and 6 in which the excess amount was set in the range of 15 to 40% (particularly, 19.5 to 36%) of the reversible capacity. The results shown in Table 1 demonstrate that the lower limit of the excess amount can be set to 5% or 15% of the reversible capacity. Also, the upper limit of the excess amount can be set to 30% or 40% of the reversible capacity. The range of the excess amount can be defined by any combination of values selected from these lower limits and upper limits.

Samples 2 and 6 had similar levels of pulse discharge characteristics. Samples 2 and 6 were identical in that the weights of the lithium foils attached to the negative electrode active material layers were equal, and differed in whether or not the positive electrode contained the lithium-absorption material. In Sample 2, the excess lithium was absorbed into the lithium-absorption material. In Sample 6, the excess lithium was not absorbed into the positive electrode, and remained on the negative electrode. Insofar as the chemical conversion treatment of the negative egative electrode in an environment having a temperature of 40 to 8ithium, the improving effect on the pulse discharge characteristics is obtained irrespective of the whereabouts of the excess lithium. However, it is not necessarily desirable that lithium remain on the negative electrode in metal form as in Sample 6, in terms of the reliability of the nonaqueous electrolyte secondary battery. By contrast, in Sample 2, not only was the improving effect on the pulse discharge characteristics obtained, but also lithium was prevented from remaining on the negative electrode. That is, by assembling a battery using a positive electrode containing a lithium-absorption material so as to allow excess lithium to be irreversibly absorbed into the lithium-absorption material, it is possible to provide a nonaqueous electrolyte secondary battery having excellent pulse discharge characteristics and high reliability.

(Sample 11)

Next, a cell for evaluation of the output characteristics of a negative electrode (single electrode) was fabricated. In Sample 11, to the same negative electrode active material layer as fabricated in Sample 1, there was attached a lithium foil containing lithium in an amount corresponding to 80.0% of the theoretical capacity of the negative electrode. Thus, the negative electrode was obtained. By opposing this negative electrode to a metallic lithium counter electrode and using the same electrolyte solution and separator as those in Sample 1, a coin cell was fabricated. As in Sample 1, the fabricated coin cell was stored in a constant-temperature chamber at 45° C. for 3 days so as to promote the chemical conversion treatment of the negative electrode active material.

(Sample 12)

A coin cell of Sample 12 was fabricated in the same manner as in Sample 11, except that a lithium foil containing lithium in an amount corresponding to 100.0% of the theoretical capacity of the negative electrode was attached to the negative electrode active material layer.

(Sample 13)

A coin cell of Sample 13 was fabricated in the same manner as in Sample 11, except that a lithium foil containing lithium in an amount corresponding to 114.7% of the theoretical capacity of the negative electrode was attached to the negative electrode active material layer. The excess amount of lithium in Sample 13 was 19.5% relative to the amount corresponding to the reversible capacity of the negative electrode.

(Sample 14)

A coin cell of Sample 14 was fabricated in the same manner as in Sample 11, except that a lithium foil containing lithium in an amount corresponding to 127.2% of the theoretical capacity of the negative electrode was attached to the negative electrode active material layer. The excess amount of lithium in Sample 14 was 36.0% relative to the amount corresponding to the reversible capacity of the negative electrode.

(Sample 15)

A coin cell of Sample 15 was fabricated in the same manner as in Sample 11, except that a lithium foil containing lithium in an amount corresponding to 140.0% of the theoretical capacity of the negative electrode was attached to the negative electrode active material layer. The excess amount of lithium in Sample 15 was 53.3% relative to the amount corresponding to the reversible capacity of the negative electrode.

(Sample 16)

A coin cell of Sample 16 was fabricated in the same manner as in Sample 11, except that a lithium foil containing lithium in an amount corresponding to 163.0% of the theoretical capacity of the negative electrode was attached to the negative electrode active material layer. The excess amount of lithium in Sample 16 was 84.0% relative to the amount corresponding to the reversible capacity of the negative electrode.

(Evaluation of Output Characteristics of Negative Electrode (Single Electrode))

Each of the coin cells of Samples 11 to 16 was placed inside a constant-temperature chamber set at −20° C., and pulse discharge was performed for 1 second with the current value set at 20 mA. The then voltage difference between the open-circuit voltage and the closed-circuit voltage was divided by the current value to calculate a resistance value [$\Omega$]. The results are shown in Table 2 and FIG. 5.

TABLE 2

| | Details of sample | | | |
| --- | --- | --- | --- | --- |
| | Amount of lithium contained in lithium foil [% vs. theoretical capacity of negative electrode] | Excess amount of lithium [% vs. theoretical capacity of negative electrode] | Excess amount of lithium [% vs. reversible capacity of negative electrode] | Resistance value [$\Omega$] |
| Sample 11 | 80.0 | — | — | 56 |
| Sample 12 | 100.0 | — | — | 54 |
| Sample 13 | 114.7 | 14.7 | 19.5 | 52.5 |
| Sample 14 | 127.2 | 27.2 | 36.0 | 45 |
| Sample 15 | 140.0 | 40.0 | 53.3 | 45 |
| Sample 16 | 163.0 | 63.0 | 84.0 | 45 |

Figure 5:
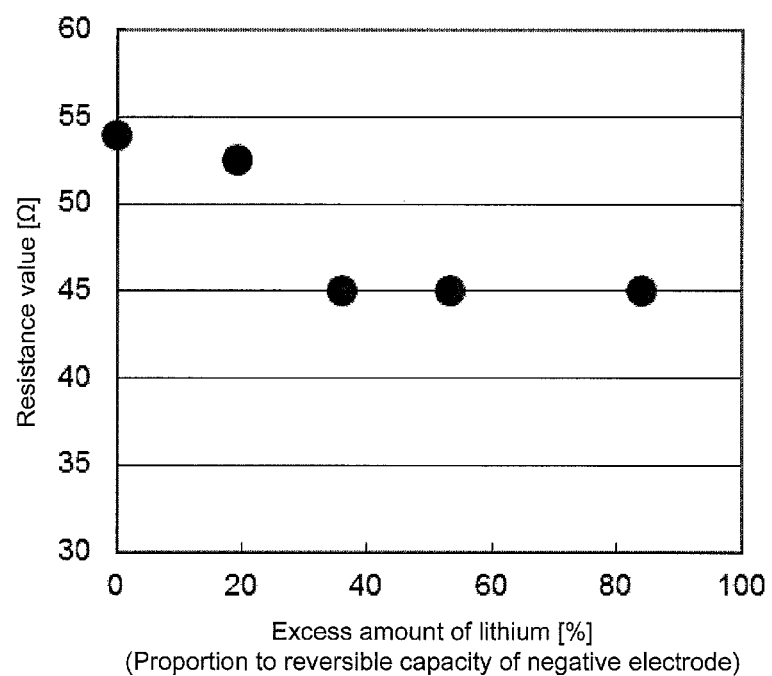
FIG. 5 is a graph showing the results of evaluation of output characteristics of negative electrodes.

As shown in Table 2 and FIG. 5, Samples 13 to 16 exhibited a lower resistance value than Samples 11 and 12. In addition, Samples 14 to 16 exhibited a lower resistance value than Sample 13. That is, increasing the excess amount of lithium enhanced the effect on reducing the resistance value. Samples 14 to 16 exhibited equal resistance values. That is, the effect on reducing the resistance value reached a plateau. In order to maximize the effect on reducing the resistance value while controlling the increase in the excess amount of lithium, the upper limit of the excess amount of lithium can be set to the amount corresponding to around 40% of the reversible capacity.

The above results reveal that the method disclosed in the present specification makes it possible to manufacture a nonaqueous electrolyte secondary battery excellent in output characteristics, particularly in pulse discharge characteristics at low temperatures.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

A negative electrode manufactured by the method disclosed in the present specification can be suitably used in electrochemical devices such as primary batteries, secondary batteries, capacitors, electrolytic capacitors, sensors, and electrochromic elements.

A nonaqueous electrolyte battery (typically, a secondary battery) manufactured by the method disclosed in the present specification can be suitably used in: power sources for transport machines and electronic devices; secondary batteries used for power smoothing in combination with power-generating facilities for thermal power generation, wind power generation, and fuel cell power generation; electricity storage systems such as emergency electricity storage systems and late-night electricity storage systems for ordinary houses or housing complexes; and uninterruptible power sources.

A nonaqueous electrolyte battery manufactured by the method disclosed in the present specification is useful as a power source for electronic devices such as portable electronic devices, electrical power tools, vacuum cleaners, and robots. Particularly, a nonaqueous electrolyte battery manufactured by the method disclosed in the present specification can be suitably used as a power source for portable electronic devices typified by mobile phones, mobile devices, personal digital assistances (PDAs), notebook personal computers, video cameras, and video game equipment.

What is claimed is:

1. A method for manufacturing a nonaqueous electrolyte battery, the method comprising:
    a negative electrode preparation step of forming a negative electrode active material layer containing at least one selected from silicon and a silicon compound as a negative electrode active material, and bringing an amount of lithium into contact with the negative electrode active material layer so as to prepare a negative electrode, the amount of lithium exceeding an amount corresponding to a theoretical capacity of the negative electrode active material layer;
    a positive electrode preparation step of preparing a positive electrode containing a positive electrode active material capable of reversibly absorbing and releasing lithium and a lithium-absorption material capable of irreversibly absorbing lithium;
    an assembling step of enclosing the positive electrode, the negative electrode, a separator, and a nonaqueous electrolyte inside an outer enclosure; and
    a negative electrode chemical conversion step of performing a chemical conversion treatment of the negative electrode active material with the lithium brought into contact with the negative electrode active material layer,
    wherein in the positive electrode preparation step, a material having room for absorption of lithium is used as the positive electrode active material,
    the theoretical capacity of the negative electrode active material layer is a total of a reversible capacity and an irreversible capacity of the negative electrode active material layer, and
    in the negative electrode preparation step, the amount of lithium brought into contact with the negative electrode active material layer is a total of an amount of lithium corresponding to the theoretical capacity and an amount of lithium corresponding to 5 to 40% of the reversible capacity.

2. The method for manufacturing a nonaqueous electrolyte battery according to claim 1, wherein
    when an amount of lithium calculated by subtracting the amount corresponding to the theoretical capacity from a total amount of lithium brought into contact with the negative electrode active material layer is defined as an excess amount of lithium, the lithium-absorption material contained in the positive electrode is in an amount sufficient to irreversibly absorb all of the excess amount of lithium.

3. The method for manufacturing a nonaqueous electrolyte battery according to claim 1, wherein the negative electrode chemical conversion step is a step of keeping the negative electrode in contact with the nonaqueous electrolyte or another nonaqueous electrolyte for a period of time.

4. The method for manufacturing a nonaqueous electrolyte battery according to claim 3, wherein in the negative electrode chemical conversion step, the negative electrode is heated.

5. The method for manufacturing a nonaqueous electrolyte battery according to claim 4, wherein the negative electrode is heated by placing the negative electrode in an environment having a temperature of 40 to 80° C.

6. The method for manufacturing a nonaqueous electrolyte battery according to claim 1, wherein the negative electrode preparation step comprises a vapor deposition step of vapor-depositing lithium on the negative electrode active material layer, and the negative electrode chemical conversion step proceeds simultaneously with the vapor deposition step.

7. The method for manufacturing a nonaqueous electrolyte battery according to claim 1, further comprising a discharge step of allowing the lithium-absorption material of the positive electrode to absorb excess lithium brought into contact with the negative electrode active material layer over the amount corresponding to the theoretical capacity.

8. The method for manufacturing a nonaqueous electrolyte battery according to claim 1, wherein the positive electrode further contains a positive electrode active material capable of reversibly absorbing and releasing lithium, and in the positive electrode preparation step, a vanadium oxide is used as the positive electrode active material.

9. The method for manufacturing a nonaqueous electrolyte battery according to claim 1, wherein the positive electrode further contains a positive electrode active material capable of reversibly absorbing and releasing lithium, and the lithium-absorption material is graphite fluoride.

10. A method for manufacturing a negative electrode used in a nonaqueous electrolyte battery, the method comprising:

a negative electrode preparation step of forming a negative electrode active material layer containing at least one selected from silicon and a silicon compound as a negative electrode active material, and bringing an amount of lithium into contact with the negative electrode active material layer so as to prepare a negative electrode, the amount of lithium exceeding an amount corresponding to a theoretical capacity of the negative electrode active material layer; and a negative electrode chemical conversion step of performing a chemical conversion treatment of the negative electrode active material with the lithium brought into contact with the negative electrode active material layer, wherein the theoretical capacity of the negative electrode active material layer is a total of a reversible capacity and an irreversible capacity of the negative electrode active material layer, and in the negative electrode preparation step, the amount of lithium brought into contact with the negative electrode active material layer is a total of an amount of lithium corresponding to the theoretical capacity and an amount of lithium corresponding to 5 to 40% of the reversible capacity.

* * * * *